(12) United States Patent
Jeong et al.

(10) Patent No.: US 11,449,318 B2
(45) Date of Patent: Sep. 20, 2022

(54) APPLICATION OPTIMIZATION METHOD AND ELECTRONIC DEVICE SUPPORTING THE SAME

(71) Applicant: Samsung Electronics Co., Ltd., Gyeonggi-do (KR)

(72) Inventors: Kwanhee Jeong, Gyeonggi-do (KR); Sekyeong Heo, Gyeonggi-do (KR); Hyojong Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/072,236

(22) Filed: Oct. 16, 2020

(65) Prior Publication Data

US 2021/0117168 A1    Apr. 22, 2021

(30) Foreign Application Priority Data

Oct. 18, 2019   (KR) .................. 10-2019-0130107

(51) Int. Cl.
```
G06F 8/65       (2018.01)
G06F 8/41       (2018.01)
G06F 3/04842    (2022.01)
G06F 3/04817    (2022.01)
G06F 3/0482     (2013.01)
```

(52) U.S. Cl.
CPC ............ *G06F 8/443* (2013.01); *G06F 3/0482* (2013.01); *G06F 3/04817* (2013.01); *G06F 3/04842* (2013.01); *G06F 8/65* (2013.01)

(58) Field of Classification Search
CPC ........ G06F 8/443; G06F 8/65; G06F 3/04817; G06F 3/04842
See application file for complete search history.

(56) References Cited

U.S. PATENT DOCUMENTS

| | | | |
|---|---|---|---|
| 8,418,157 B2 | 4/2013 | Ogawa et al. | |
| 9,760,351 B2 | 9/2017 | Johnson et al. | |
| 2006/0236310 A1 | 10/2006 | Domeika et al. | |
| 2006/0282815 A1* | 12/2006 | Yodaiken | .................. G06F 8/20 717/101 |

(Continued)

FOREIGN PATENT DOCUMENTS

| | | |
|---|---|---|
| KR | 10-0828364 B1 | 5/2008 |
| KR | 10-2016-0105366 A | 9/2016 |
| KR | 10-2017-0039999 A | 4/2017 |

OTHER PUBLICATIONS

International Search Report dated Jan. 26, 2021.
Indian OA dated Aug. 5, 2022.
European Search Report dated Jul. 11, 2022.

*Primary Examiner* — Andrea C Leggett
(74) *Attorney, Agent, or Firm* — Cha & Reiter, LLC

(57) ABSTRACT

An electronic device and method are disclosed. The electronic device includes an input device, a display, a memory and a processor. The processor implements the method, including: determining, by at least one processor, whether a designated condition is satisfied, based on determining that the designated condition is satisfied, displaying, on a display of the electronic device, a list of applications installed in a memory of the electronic device, detecting a first input through an input device selecting at least one application from the list, and compiling the selected at least one application.

18 Claims, 13 Drawing Sheets

(56) References Cited

U.S. PATENT DOCUMENTS

| | | | |
|---|---|---|---|
| 2009/0157906 A1* | 6/2009 | Yanagi | G06F 3/1277 |
| | | | 710/5 |
| 2010/0042976 A1 | 2/2010 | Hines | |
| 2013/0125102 A1 | 5/2013 | Kimura | |
| 2013/0196615 A1* | 8/2013 | Zalmanovitch | H04M 15/7652 |
| | | | 455/405 |
| 2013/0268921 A1 | 10/2013 | Brauneis et al. | |
| 2014/0074615 A1* | 3/2014 | Hope | G06Q 30/0267 |
| | | | 705/14.64 |
| 2016/0041816 A1 | 2/2016 | Yang et al. | |
| 2016/0321452 A1* | 11/2016 | Richardson | H04W 12/37 |
| 2017/0352095 A1* | 12/2017 | Jurss | G06Q 30/0222 |
| 2018/0293087 A1 | 10/2018 | Lee et al. | |
| 2020/0285752 A1* | 9/2020 | Wyatt | G06F 21/554 |
| 2021/0096892 A1 | 4/2021 | Nigro et al. | |
| 2021/0250424 A1* | 8/2021 | Cameron | H04L 67/01 |

\* cited by examiner

| compile-filter | Description |
|---|---|
| run-from-apk | Execute application using a dex file in apk |
| extract | Decompress dex files in apk and copy to specific path |
| verify | Perform only dex code verification |
| quicken | Perform dex code verification and optimize some of dex instructions |
| speed-profile | AOT-compile dex code verification and method in profile |
| speed | AOT-compile dex code verification and all methods |

FIG.3

APPLICATION OPTIMIZATION METHOD AND ELECTRONIC DEVICE SUPPORTING THE SAME

CROSS-REFERENCE TO RELATED APPLICATION(S)

This application is based on and claims priority under 35 U.S.C. 119 to Korean Patent Application No. 10-2019-0130107, filed on Oct. 18, 2019, in the Korean Intellectual Property Office, the disclosure of which is herein incorporated by reference in its entirety.

BACKGROUND

1) Field

Certain embodiments of the disclosure relate to an application optimization technology.

2) Description of Related Art

With the development of computing systems, a variety of applications (or "apps") operating in electronic devices such as smart phones are being produced. These applications may be implemented in multiple lines of code to achieve a specific function, and may be packaged and distributed. When the application is installed on an electronic device, the code written, as in a programming language, may be converted into a format supported by the platform of the electronic device, and the converted code may be used as an instruction set for providing the function. For example, in an electronic device to which the Android operating system (OS) is applied, application code may be compiled in accordance with a runtime environment and converted into a native code operable in the Android OS.

Methods of compiling the code may include an ahead-of-time (AOT) method, a just-in-time (JIT) method, and a hybrid method in which the AOT method and the JIT method are combined have been used.

The AOT method compiles the code at the time of installation of the application, converting the same into executable code, and then directly reads the converted executable code when the application is executed. In the AOT method, since the code is already converted into executable code when the application is installed, the time taken to execute the application may be shortened, but it may take additional time to install the application, and a large amount of storage space may be required to install the application.

The JIT method compiles necessary portions of code at an appropriate time, when executing an application. In the JIT method, when repetitive execution is detected while operating in an interpreter method for a loaded class, among the code, a JIT compiler may be appropriately operated to improve execution speed. In other words, the execution time of execution code is very fast, and memory caching is fundamentally performed, so performance can be maximized when the class is repeatedly called. However, in the JIT method, since the code is compiled at runtime, although the installation time of the application is reduced, but the time taken to execute the application may increase. In addition, when the code cached in the memory is released and executed again, reconverting the code costs additional time, resulting in delays in the operation of the application.

The hybrid method can shorten the installation time of the application and reduce the space utilized to install the application, by using the JIT method when installing the application, and furthermore, imitating an AOT background daemon using a job scheduler and performing compilation in the background to generate execution code when a specific condition is met. These steps may be executed after storing a profile according to a historical usage pattern through an interpreter, and may directly utilize the execution code when the application is executed, thereby shortening execution time.

Meanwhile, with the advent of the newest iterations of the Android operating system, an execution environment called Android runtime (hereinafter, referred to as ART) is supported. The ART may use the hybrid method. In the ART, a tool called dex2oat is used to compile a Dalvik executable (DEX) file (i.e., a set of code) of the application, in which case the operating method may be designated by a configuration value of a compile filter, which in turn may be configured based on a user profile indicating a historic usage pattern. That is, in the ART, application code may be compiled according to a compilation filter, configured based on a historic usage pattern.

The above information is presented as background information only to assist with an understanding of the disclosure. No determination has been made, and no assertion is made, as to whether any of the above might be applicable as prior art with regard to the disclosure.

SUMMARY

When an application is installed over the air (OTA), or when the configuration values are re-initialized through a factory reset, the compilation filter of the application may be configured having a specific value, and the overall performance of the application, including the execution of the application, may be negatively affected. In addition, in hybrid method, since the code of the application can be compiled when a specific condition (e.g., a state of charge, an idle state, or a state in which a specified time such as a particular time every day has arrived) is satisfied, there is no choice but to wait until the specific condition is satisfied and compilation occurs, in order to detect a need to improve the performance of the application.

Certain embodiments of the disclosure may provide a method for optimizing an application by compiling code of an application based on user input, and an electronic device supporting the same.

An electronic device according to certain embodiments may include an input device, a display, a memory, and a processor operatively connected to the input device, the display and the memory, wherein the processor is configured to: determine whether a designated condition is satisfied, based on determining that the designated condition is satisfied, display, on the display, a list of applications installed in the memory, detect a first input through the input device selecting at least one application from the list, and compile the selected at least one application.

In addition, an application optimization method of an electronic device according to various embodiment may include determining, by at least one processor, whether a designated condition is satisfied, based on determining that the designated condition is satisfied, displaying, on a display of the electronic device, a list of applications installed in a memory of the electronic device, detecting a first input through an input device selecting at least one application from the list, and compiling the selected at least one application.

According to certain embodiments, by compiling application code, based on user input, application optimization may be performed at a time desired by the user.

In addition, according to certain embodiments, by compiling application code according to a compilation filter selected based on user input, an application desired by a user may be preferentially optimized.

In addition, according to certain embodiments, information on an application being compiled in the background is provided to the user, so that the user can easily recognize the state of compilation of the application.

In addition to this, various effects that are directly or indirectly identifiable through this document can be provided.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a compilation filter of an application according to an embodiment;

In connection with the description of the drawings, the same or similar reference numerals may be used to indicate the same or similar components.

DETAILED DESCRIPTION

Figure 1:
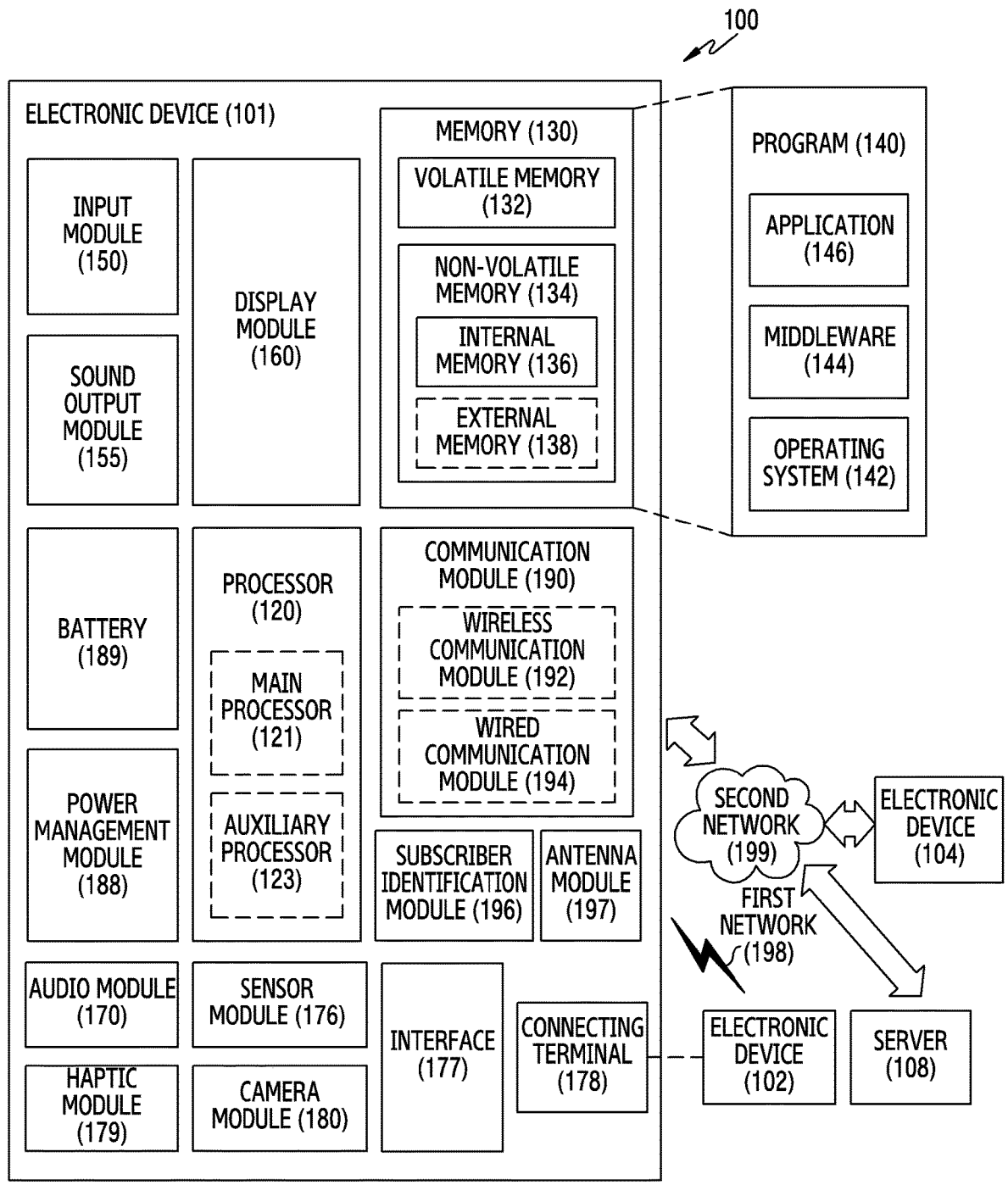
FIG. 1 is a block diagram of an electronic device in a network environment according to certain embodiments.

Hereinafter, certain embodiments of the disclosure will be described with reference to the accompanying drawings. For convenience of explanation, the components illustrated in the drawings may be exaggerated or reduced in size, and the disclosure is not necessarily limited by what is illustrated.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, if the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specialized for processing an artificial intelligence model. The artificial intelligence model may be created through machine learning. Such learning may be performed, for example, in the electronic device 101 on which artificial intelligence is performed, or may be performed through a separate server (e.g., the server 108). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155, or an external electronic device (e.g., an electronic device 102)(e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 192 may support, for example, a high frequency band (e.g., an mmWave band) to achieve a high data rate. The wireless communication module 192 may support various technologies for securing performance in a high frequency band, for example, beamforming, massive array Multiple-Input and Multiple-Output (MIMO), and Full-Dimensional MIMO (FD-MIMO), an array antenna, analog beam-forming, or a large scale antenna. The wireless communication module 192 may support various requirements defined in the electronic device 101, an external electronic device (e.g., the electronic device 104), or a network system (e.g., the second network 199). According to an embodiment, the wireless communication module 192 may support a peak data rate (e.g., 20 Gbps or more) for realizing eMBB, a loss coverage (e.g., 164 dB or less) for realizing mMTC, or U-plane latency (e.g., 0.5 ms or less or a round trip of 1 ms or less for each of downlink (DL) and uplink (UL)) for realizing URLCC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., array antenna). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may implement an mmWave antenna module. According to an embodiment, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, technologies of cloud computing, distributed computing, Mobile Edge Computing (MEC), or client-server computing may be used. The electronic device 101 may provide an ultra-low latency service by using, for example, distributed computing or mobile edge computing. In another embodiment, the external electronic device 104 may include an Internet of Things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., a smart home, a smart city, a smart car, or health care) based on a 5G communication technique and an IoT related technique.

Figure 2:
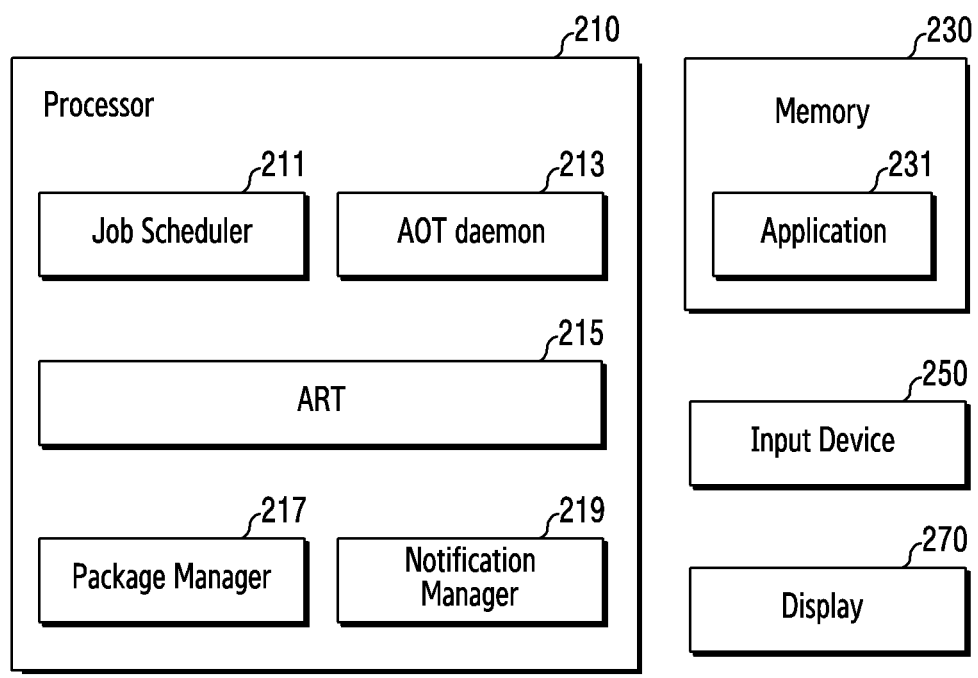
FIG. 2 is a block diagram of an electronic device related to application optimization according to an embodiment.

FIG. 2 is a block diagram of an electronic device related to application optimization according to an embodiment, and FIG. 3 is a diagram illustrating a compilation filter of an application according to an embodiment.

In an electronic device (e.g., the electronic device 101) to which the Android operating system is applied, an ART 215 execution environment may be supported, and the ART 215 may use a hybrid method in which the AOT method and the JIT method are combined as a method for compiling code of the application 231. In addition, the ART 215 uses the dex2oat tool to compile the DEX file of the application 231, and the dex2oat tool may designate an operation method according to a configuration value of the compilation filter 300. At this time, since the compilation filter 300 is configured based on a profile according to a user's usage pattern, in the ART 215, code of the application 231 may be compiled according to a compilation filter 300 configured based on a profile according to a user's usage pattern.

However, when the application 231 is installed through OTA or the configuration value is initialized through factory initialization, the compilation filter 300 of the application 231 is configuration as a specific value, so the overall performance of the application 231 may be degraded. In addition, in the hybrid method, since code of the application 231 can be compiled when a specific condition (e.g., a charging state, a dormant state, or a state in which a specified time, such as a preset daily time, has arrived) is satisfied, there is no choice but to wait until the specific condition is satisfied in order to improve the performance of the application 231.

In order to solve the above-described problem, the electronic device can optimize the application 231 at a time desired by the user by compiling code of the application 231, based on user input, and can provide a function of preferentially optimizing the application 231 desired by the user by allowing the compile filter 300 of the application 231 to be selected based on user input.

Referring to FIG. 2, an electronic device for providing the above-described functions may include a processor 210 (e.g., the processor 120), a memory 230 (e.g., the memory 130), an input device 250 (e.g., the input device 150), and a display 270 (e.g., the display device 160). However, the configuration of the electronic device is not limited thereto. According to certain embodiments, at least one of the above-described elements may be omitted from the electronic device, and the electronic device may further include at least one other element.

The processor 210 may control at least one other component of the electronic device, and may perform various data processing or operations. The processor 210 may include a job scheduler 211, an AOT daemon 213, an ART 215, a package manager 217, and a notification manager 219. At least one of the job scheduler 211, the AOT daemon 213, the ART 215, the package manager 217, or the notification manager 219 may be implemented as a type of program stored in the memory 230. In this case, at least one of the job scheduler 211, the AOT daemon 213, the ART 215, the package manager 217, or the notification manager 219 may be implemented as an instruction stored in the memory 230, and when the instruction is executed by the processor 210, the processor 210 may perform a function corresponding to the instruction.

The job scheduler 211 may manage a background task to be performed under a specific condition. As an example, the job scheduler 211 may activate the AOT daemon 213 under a specific condition, and may control the code of the application 231 to be compiled through the AOT daemon 213 operating in the background. Here, the specific condition may include not only a system configuration condition, such as the state of charge of the electronic device, a sleep state of the electronic device, or a state in which a specified time, such as a preset time every day, has arrived, but also a user-related condition, determined through interfacing with a user, such as the state in which user input has occurred.

The AOT daemon 213 may be executed by the job scheduler 211 and may operate as a background service. The AOT daemon 213 may compile a dex file existing in an apk file, which is a package containing of the application 231, using the dex2oat tool. The dex file compiled by the AOT daemon 213 may be output as an oat file. The size of the oat file may differ according to the compilation filter 300 used when compiling, and the performance of the application 231 may also differ.

As shown in FIG. 3, the compilation filter 300 may include an option to compile the dex file (e.g., the code of the application 231). For example, when the compilation filter 300 is configured as "run-from-apk", an application may be executed using the dex file in the apk file. When the compilation filter 300 is configured to "extract", the dex file in the apk file may be decompressed and copied to a specific file path. When the compilation filter 300 is configured as "verify", code verification of the dex file may be performed (e.g., excluding other processes). When the compilation filter 300 is configured as "quicken", code verification of the dex file may be performed and some dex instructions can be optimized. When the compilation filter 300 is configured as "speed-profile", code verification of the dex file may be performed and a method in the profile may be AOT compiled. When the compilation filter 300 is configured as "speed", code verification of the dex file may be performed and all methods may be AOT compiled.

In the table shown in FIG. 3, the size of the oat file resulting from successful compilation increases as the compilation filter 300 moves downwards (i.e., the direction from "run-from-apk" to "speed"), whereby the performance of the application (231) thereby improves. Conversely, in the table shown in FIG. 3, as the compilation filter 300 moves upwards (i.e., the direction from "speed" to "run-from-apk"), the size of the oat file resulting from the compilation decreases, whereas the performance of the application 231 degrades.

The ART 215, which is a runtime environment used by the application 231 and the system service, may generate an oat file by compiling a dex file using the dex2oat tool, and may execute the oat file directly when the application 231 is executed.

According to an embodiment, the ART 215 may determine whether optimization of the application 231 is utilized. For example, the ART 215 may determine whether the application 231 is to be optimized, based on a profile according to a user's usage pattern.

According to an embodiment, the ART 215 may select at least one application 231 from an application list, based on user input received through the input device 250, and may control the code of the selected application 231 to be compiled. In addition, the ART 215 may select at least one application 231 from an application list, based on user input received through the input device 250, and may limit compilation of code of the selected application 231.

According to an embodiment, the ART 215 may change a compilation filter for a specific application 231, based on user input received through the input device 250. For example, the ART 215 may change a compilation filter for the specific application 231 to a compilation filter selected based on the user input. For example, when the specific application 231 is selected as an application requiring optimization based on user input, the compilation filter for the specific application 231 may be configured as a first option (e.g., "speed-profile" or "speed"). As another example, when the specific application 231 is selected as an application that does not require optimization, based on user input, a compilation filter for the specific application 231 may be configured as a second option (e.g., "verify").

According to an embodiment, the ART 215 may provide information on the application 231 being compiled to a user. For example, the ART 215 may transmit information on the application 231 being compiled (e.g., identification information of the application 231) to the notification manager 219, and the notification manager 219 may output the received information on the application 231 to the display 270.

The package manager 217 may manage installation or update of the application 231 distributed in the form of a package file (e.g., an apk file). For example, when the application 231 is distributed in a package form, the package manager 217 may parse the package, separate code and data included in the package, and store the same in the memory 230.

The notification manager 219 may display or provide notification of an event such as an arrival message, an appointment, and a proximity notification in a manner that does not interfere with the user. As an example, the notification manager 219 may display information on the application 231 being compiled, received from the ART 215, on the display 270.

The memory 230 may store various types of data used by at least one component of the electronic device. In addition, the memory 230 may store an application 231.

The input device 250 may receive instructions or data to be used for components of the electronic device from outside the electronic device. For example, the input device 250 may receive user input.

The display 270 may display various content (e.g., text, images, videos, icons, or symbols) to the user. The display 270 may include a touch screen, and may receive, for example, touch, gesture, proximity, or hovering input using an electronic pen or a user's body part.

As described above, according to certain embodiments, an electronic device (e.g., the electronic device 101) may include an input device (e.g., the input device 150, 250), a display (e.g., the display device 160 or display 270), a memory (e.g., the memory 130, 230), and a processor (e.g., the processor 120, 210) operatively connected to the input device, the display and the memory, such that the processor may be configured to: determine whether a designated condition is satisfied; display, on the display, a list of applications installed in the memory when the designated condition is satisfied; select at least one application from the list based on first user input received through the input device; and compile the selected at least one application.

According to certain embodiments, the processor may be configured to: select a compilation filter for the selected at least one application based on second user input received through the input device; and compile the selected at least one application based on the selected compilation filter.

According to certain embodiments, the processor may be configured to display, on the display, information on the selected at least one application being compiled.

According to certain embodiments, the designated condition may include at least one of a condition in which the electronic device is in a firmware-over-the-air (FOTA) update state, or a condition in which the second user input is received through the input device.

According to certain embodiments, the processor may be configured to display, on the display, a notification object for optimization of the selected at least one application when the specified condition is satisfied.

According to certain embodiments, the notification object may include at least one of an icon or an image displayed on a status bar of the electronic device, a pop-up window displayed on a predetermined area of the display, or a card-type object displayed on a function control screen.

According to certain embodiments, the processor may be configured to execute a configuration application for optimizing the selected at least one application upon receiving a second user input on the notification object through the input device.

According to certain embodiments, the designated condition may include a condition in which the electronic device is in an initialized state, and the processor may be configured to: identify user account information stored in an external server when receiving a second user input on the notification object through the input device; and receive and apply a configuration value for optimization of the selected at least one application from the external server when the user account information is identified.

According to certain embodiments, the processor may be configured to: configure a compilation filter for the selected at least one application, based on a profile generated based on a usage pattern of the electronic device; and compile the selected at least one application based on the configured compilation filter.

According to certain embodiments, the processor may be configured to: configure a compilation filter for the selected at least one application as an option to perform code verification for the selected at least one application; and limit compilation of the selected at least one application using a compilation filter of the configured option.

Figure 4:
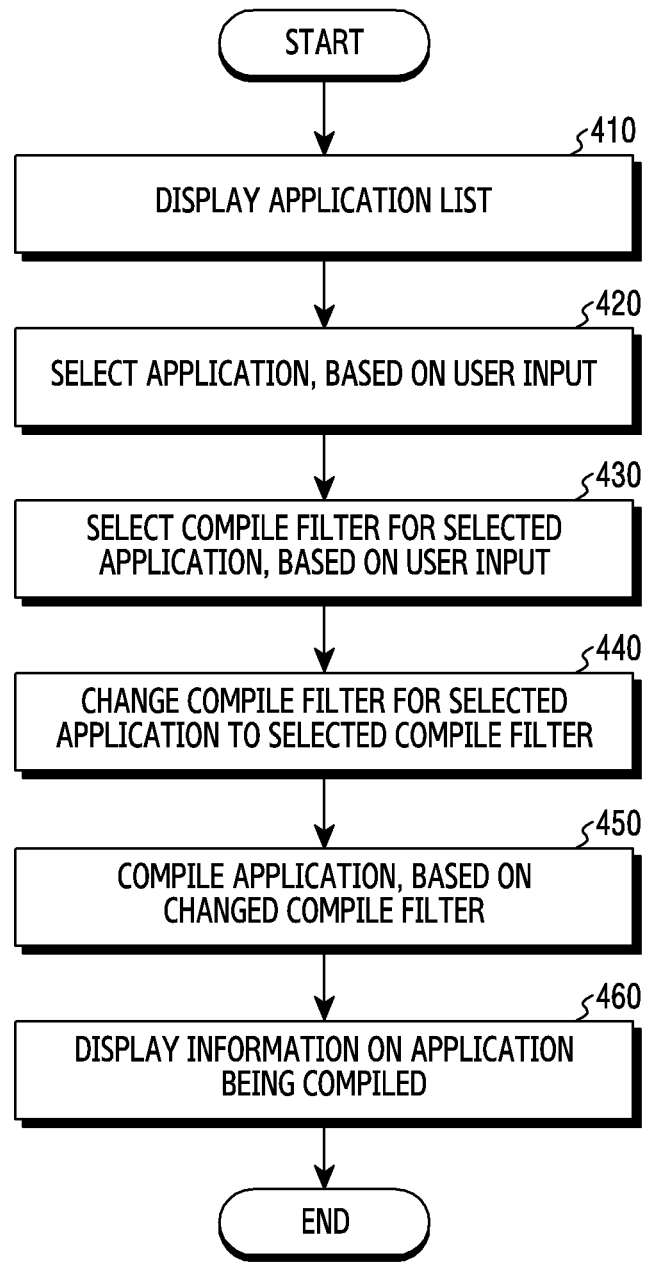
FIG. 4 is a diagram illustrating a method of optimizing an application according to an embodiment.

FIG. 4 is a diagram illustrating a method of optimizing an application according to an embodiment.

Referring to FIG. 4, in operation 410, a processor (e.g., the processor 120, 210) of an electronic device (e.g., the electronic device 101) may display a list (hereinafter, referred to as "application list") for at least one application (e.g., the application 146, 231) installed in a memory (e.g., the memory 130, 230) on a display (e.g., the display device 160 or display 270). The application list may include, for example, a list of all applications installed in the memory, a list of applications displayed on a launcher, or a list of applications selected based on usage history information. The list of applications selected based on the usage history information may include, for example, a list of recently used applications or a list of frequently used applications.

In operation 420, the processor may select at least one application based on user input received through an input device (e.g., the input devices 150 and 250). For example, the processor may select at least one application from among applications included in the application list, based on user input selecting the application from the displayed application list.

In operation 430, the processor may select a compilation filter for the selected application, based on user input received through the input device. Here, the user input (e.g., first user input) received through the input device in operation 420 and the user input (e.g., second user input) received through the input device in operation 430 may be different user input, or the same user input. When the first user input and the second user input are different user inputs, the processor may display options for selectable compilation filters (e.g., "run-from-apk", "extract", "verify", "quicken", and "speed-profile" in FIG. 3, or "speed") on the display (e.g., between operation 420 and operation 430), and may configure (e.g., select) a compilation filter for the selected application, based on the second user input selecting one of the displayed compilation filters available for use. When the first user input and the second user input are the same user input, the processor may select (or configure) the compilation filter as a first option (e.g., "speed-profile" or "speed") when the selected application is an application requiring optimization, and may select (or configure) the compilation filter as a second option (e.g., "verify") when the selected application is an application that does not require optimization.

In operation 440, the processor may change the compilation filter for the selected application to the selected compilation filter. For example, in operation 420, the processor may change a compilation filter for the selected application to a compilation filter selected in operation 430 by the user input.

In operation 450, the processor may compile the application, using the changed compilation filter. For example, the processor may compile the application code according to one of the compilation filters 300 shown in FIG. 3. For example, when the option of the compilation filter is "speed-profile", the processor may compile a frequently used method using a profile created by analyzing a user's usage pattern, and may compile all methods when the option of the compilation filter is "speed". In this case, despite using more storage space, the performance of the application may be improved. As another example, when the option of the compilation filter is "verify", the processor may limit compilation to performing code verification. In this case, storage space can be secured instead of deteriorating the performance of the application.

In operation 460, the processor may display information on the application being compiled. For example, the processor may output identification information of an application being compiled on the display.

Figure 5:
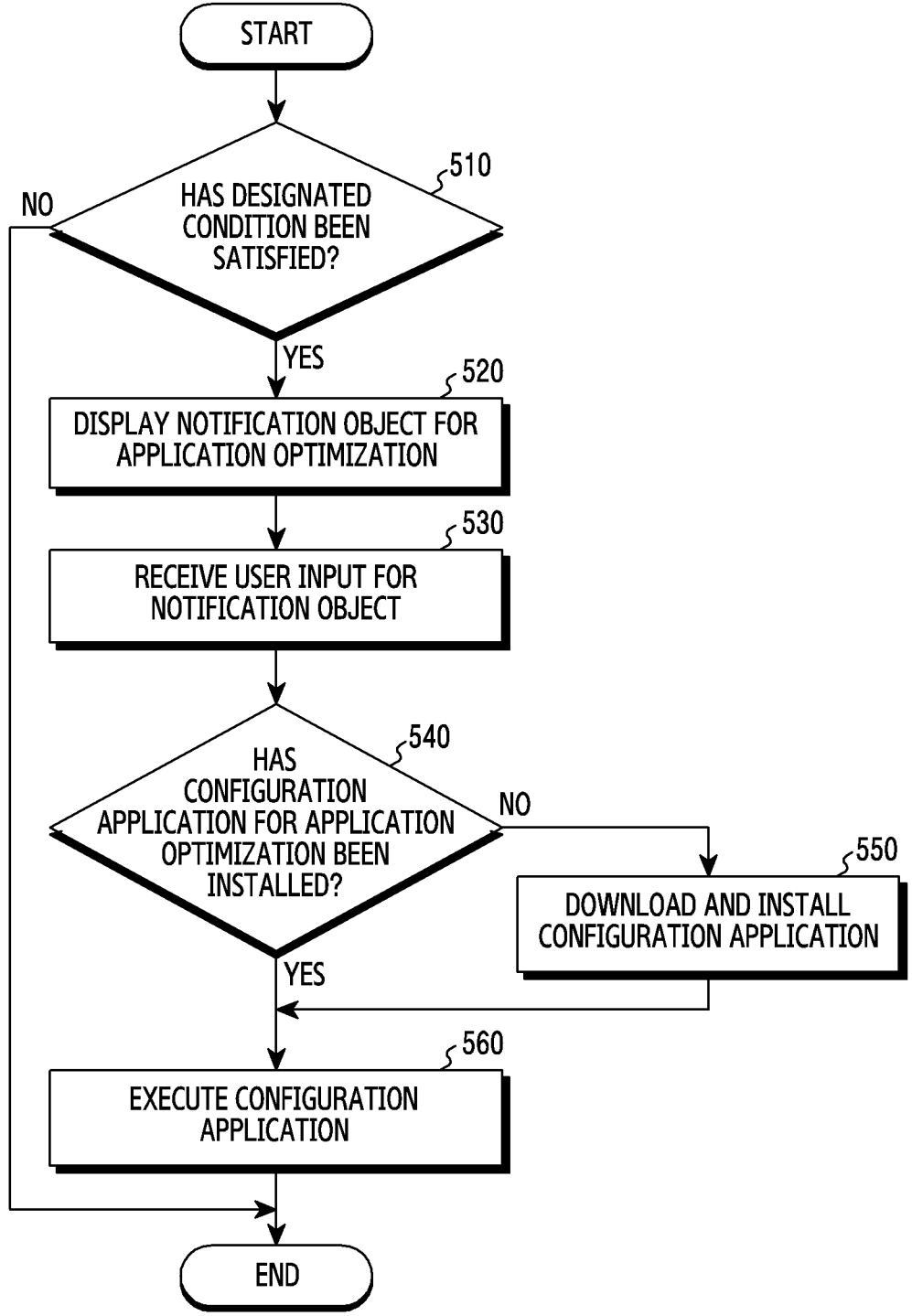
FIG. 5 is a diagram for describing a method of executing a configuration application for application optimization according to an embodiment.

FIG. 5 is a diagram for describing a method of executing a configuration application for application optimization according to an embodiment.

Referring to FIG. 5, in operation 510, a processor (e.g., the processor 120, 210) of an electronic device (e.g., the electronic device 101) may determine whether a designated condition is satisfied. The designated condition may include, for example, a condition in which a firmware-over-the-air (FOTA) update state of the electronic device or user input has occurred.

When the specified condition is satisfied, in operation 520, the processor may display a notification object selectable to request application optimization. For example, the processor may display a notification object, indicating that an application can be optimized, on a display (e.g., the display device 160 or the display 270). The notification object may include, for example, an icon (or image) displayed on the status bar of the electronic device, a pop-up, or a card-shaped object displayed on a function control screen (e.g., a quick panel). The function control screen may allow changing of the configuration of functions supported by the electronic device, or notifying the user of various events (e.g., a message reception event, scheduled alarm event, object notification registration event, etc.) occurring in the electronic device. For example, the function control screen may be displayed by dragging down from the upper area of the screen of the electronic device (e.g., dragging down or expanding a top notification bar of a user interface).

In operation 530, the processor may receive user input on the displayed notification object through an input device (e.g., input devices 150 or 250). For example, the processor may receive user input selecting the notification object displayed on the display.

In operation 540, the processor may determine whether a configuration application for application optimization has been installed. For example, the processor may determine whether the configuration application has been installed in the memory using identification information on all applications installed in the memory (e.g., the memory 130, 230). The configuration application may be an application that supports configuration as to whether or not to optimize an application installed in the memory and the degree of optimization.

When the configuration application is not installed, in operation 550, the processor may download the configuration application from a content provision server and install the same in the memory. Also, in operation 560, the processor may execute the configuration application.

Figure 6:
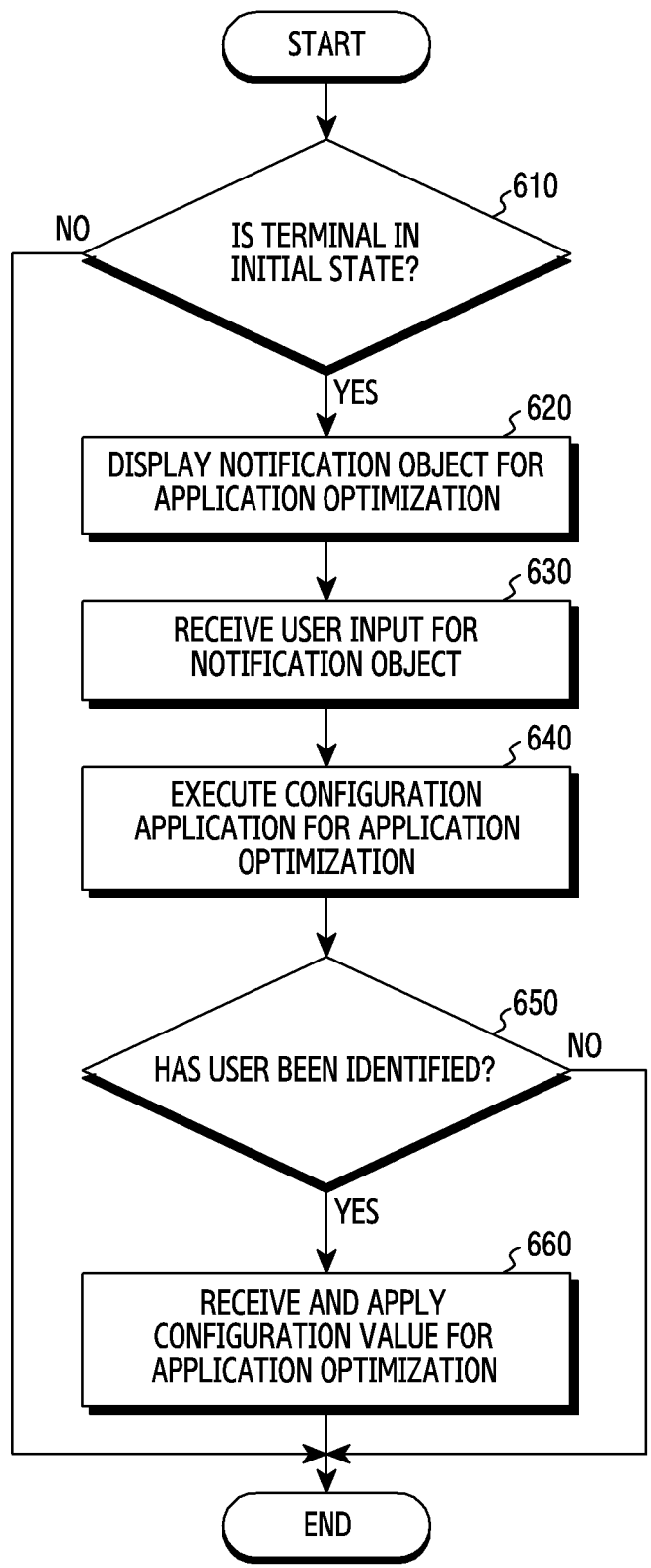
FIG. 6 is a diagram illustrating a method of applying a configuration value for application optimization when initializing a terminal according to an embodiment.

FIG. 6 is a diagram illustrating a method of applying a configuration value for application optimization when initializing a terminal according to an embodiment.

Referring to FIG. 6, in operation 610, a processor (e.g., processors 120 and 210) of an electronic device (e.g., the electronic device 101) may determine whether the terminal is in an initialized state. For example, the processor may identify whether the electronic device has been factory initialized.

When the terminal of the electronic device is in the initialized state, in operation 620, the processor may display a notification object selectable for requesting application optimization. For example, the processor may display a notification object indicating that an application can be optimized on a display (e.g., the display device 160 or the display 270). The notification object may include, for example, an icon (or image) displayed on a status bar of the electronic device, a pop-up, or a card-shaped object displayed on a function control screen (e.g., a quick panel).

In operation 630, the processor may receive user input on the displayed notification object through an input device (e.g., input devices 150 or 250). For example, the processor may receive user input for selecting the notification object displayed on the display.

In operation 640, the processor may execute a configuration application for application optimization. The configuration application may control whether to optimize an application installed in a memory (e.g., the memories 130 and 230), and a degree of optimization to apply to the application.

In operation 650, the processor may determine whether user identification information has been identified. The user identification information may include, for example, information on a user account stored in a server for synchronizing applications and data installed on the electronic device. After executing the configuration application, the processor may access (or connect to) the server through a login process in the configuration application, and may identify the user identification information by identifying login information (or user account information).

When the user identification information is confirmed, in operation 660, the processor may receive a configuration value for controlling optimization of the application from the server and apply the configuration value to the electronic device. The configuration value received from the server may include at least one of, for example, usage history information for an application, a list of applications to be optimized, as selected by the user from among existing applications installed in the terminal, or selection of a compilation filter for each application.

Figure 7:
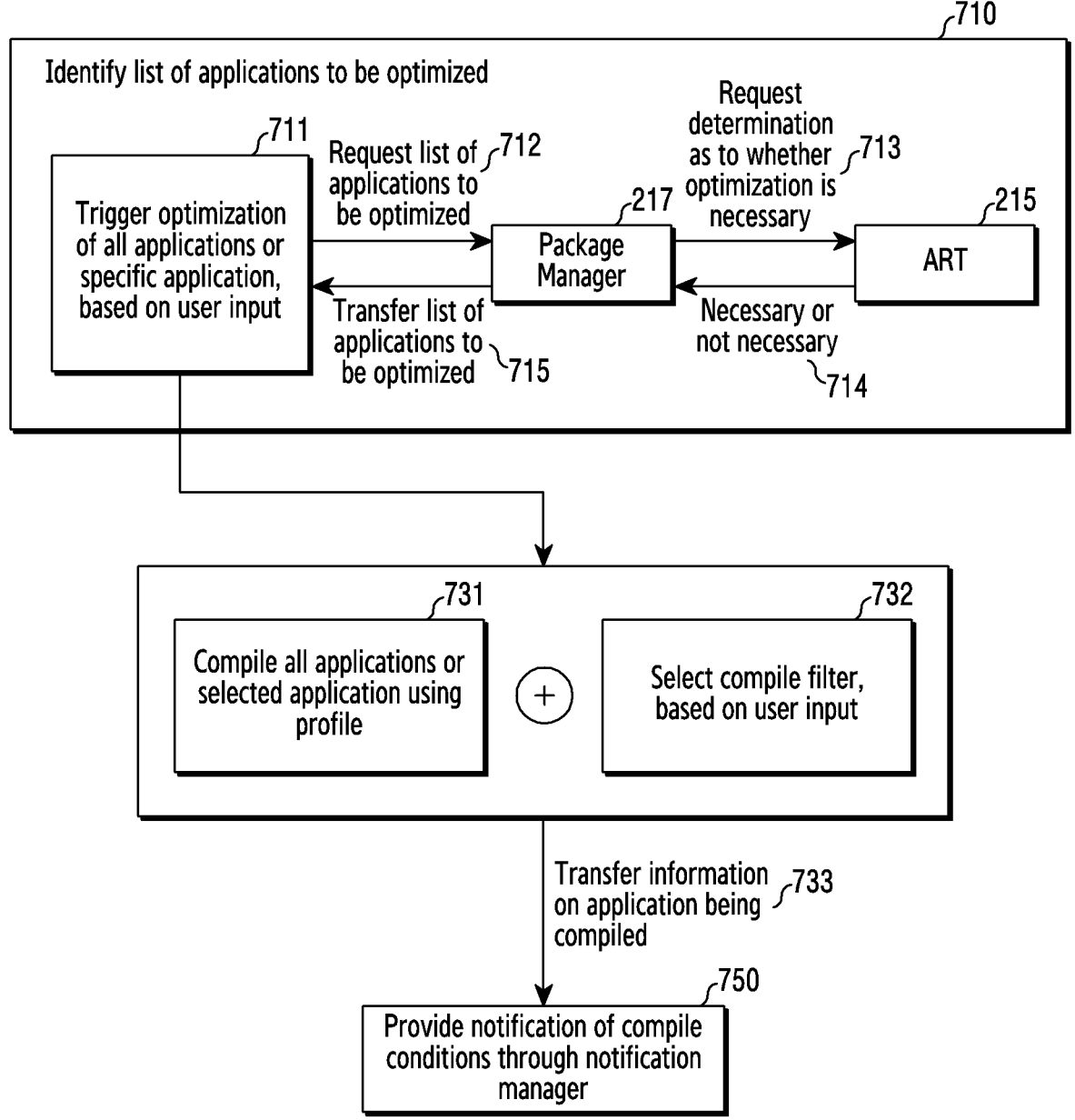
FIG. 7 is a diagram illustrating a method of optimizing an application, based on user input according to an embodiment.

FIG. 7 is a diagram illustrating a method of optimizing an application, based on user input according to an embodiment.

Referring to FIG. 7, in operation 710, a processor (e.g., processors 120 and 210) of an electronic device (e.g., the electronic device 101) may identify a list of applications to be optimized. For example, in operation 711, when an optimization function is triggered for all or a specific application installed in a memory (e.g., memories 130, 230), based on user input through an input device (e.g., input devices 150, 250), the processor may request a list of applications to be optimized from the package manager 217 in operation 712.

Upon receiving the request, the package manager 217 may request the ART 215 to determine the need for optimization of each included application while scanning the package-type applications installed in the memory in operation 713.

Upon receiving the request, the ART 215 may determine whether optimization of each corresponding application is to be performed, based on a profile according to a user's usage pattern. For example, the ART 215 may determine whether the corresponding application is a recently used application or a frequently used application, based on the profile, and may determine that the application is to be optimized, when the application is presently un-optimized despite being a recently used application or a frequently used application.

When it is determined that the application is to be optimized, the ART 215 may transmit, in operation 714, the result of determining the need to optimize the application (e.g., "utilized" or "not utilized") to the package manager 217.

Upon receiving the result of determination of the need for optimization, the package manager 217, in operation 715, may select an application for which the result of determination of the need for optimization is "utilized" as an application to be optimized, and may transmit an optimization target application list of optimization target applications to the processor.

Thereafter, in operation 731, the processor may compile all of the applications, or selected applications installed in the memory, with respect to the profile. For the applications selected as optimization target applications, a compilation filter may be configured utilizing a first default configuration option (e.g., "speed-profile").

According to an embodiment, in operation 732, the processor may select a compilation filter for the optimization of the target application, based on a user input received through the input device. For example, the processor may change the default compilation filter for the optimization target application to a selected compilation filter as indicated by the user, based on the user input. For example, the processor may change the compilation filter for the optimization target application from the default option to a user customized second option (e.g., "speed"). Operation 732 may be performed before operation 731 is performed.

When a compilation filter for the optimization target application is selected and the optimization target application is compiled according to the selected compilation filter, then in operation 733, the processor may transmit information on the application being compiled to the notification manager 219.

The notification manager 219 receiving the information on the application may notify the user of the progress of compilation of the application in operation 750. For example, the notification manager 219 may output information on the received application to a display (e.g., the display device 160 or the display 270).

Figure 8:
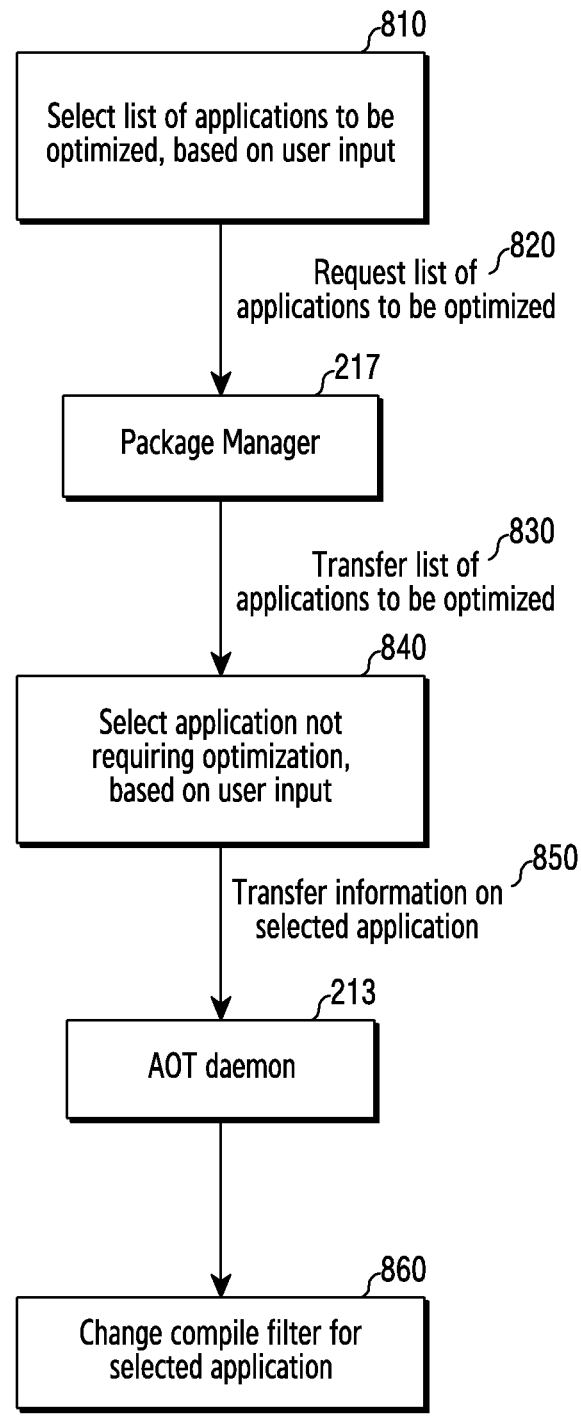
FIG. 8 is a diagram for describing a method of restricting compilation of an application based on user input according to an embodiment.

FIG. 8 is a diagram for describing a method of restricting compilation of an application based on user input according to an embodiment.

Referring to FIG. 8, in operation 810, a processor (e.g., processors 120 and 210) of an electronic device (e.g., the electronic device 101) may select a list of applications to be optimized from among applications installed in the memory (e.g., the memory 130, 230), based on a user input detected through an input device (e.g., the input device 150, 250).

In operation 820, the processor may request a list of applications to be optimized from the package manager 217. Upon receiving the request, the package manager 217 may request the ART 215 to determine the necessity of optimization for each application while scanning the package type applications installed in the memory. In addition, the ART 215 receiving the request may determine whether optimization of a corresponding application is to be executed, based on a profile according to a user's usage pattern. For example, the ART 215 determines whether the corresponding application is a recently used application or a frequently used application based on the profile, and may determine that the application is to be optimized, when the application is not present optimized while also being a recently used application or a frequently used application. In addition, when it is determined that the application is to be optimized, the ART 215 may transmit the determination to optimize the application (e.g., "utilized" or "not utilized") to the package manager 217.

In operation 830, the package manager 217 may transmit a list of applications to be optimized to the processor. For example, the package manager 217, having received the result of determination of the need for optimization from the ART 215, may select an application for which the result of determination of the need for optimization is "utilized" as an optimization target application, and transmit an optimization target application list of optimization target applications to the processor.

In operation 840, the processor may allow selection of an application indicating that the user does wish the application to be optimized, based on user input through the input device. For example, based on the user input, the processor may designate an application to be omitted from optimization (e.g., an application indicate by the user as not requiring optimization) among applications included in the optimization target application list.

In operation 850, the processor may transmit information on the selected application to the AOT daemon 213. For example, the processor may transmit information on an application selected as not requiring optimization to the AOT daemon 213.

In operation 860, the AOT daemon 213 may change the compilation filter for the selected application. For the application selected as a target for which optimization is not to be performed, a compilation filter may be configured under a first option (e.g., "verify") by default. Accordingly, when the compilation filter is configured as the first option, compilation may be restricted to performing code verification without substantive optimization. In this case, the storage space can be secured instead of deteriorating the performance of the application.

According to an embodiment, the AOT daemon 213 may change a compilation filter of the selected application but maintain a profile according to a user's usage pattern.

Figure 9:
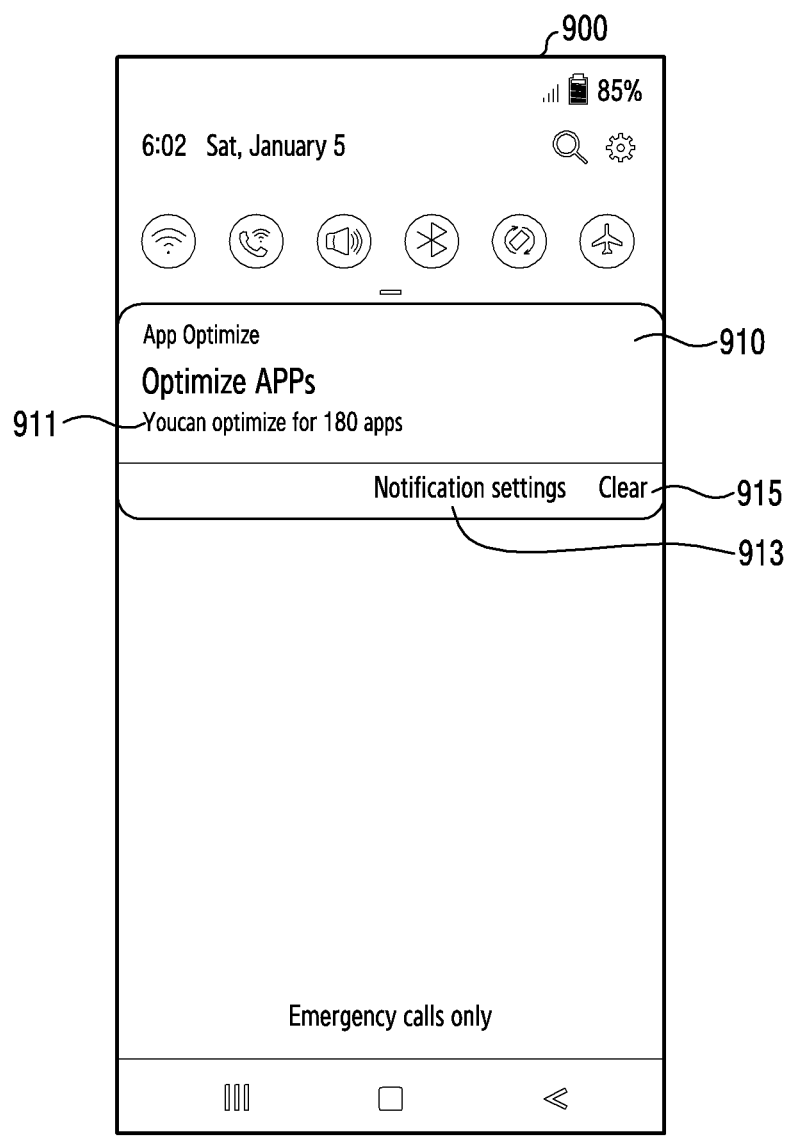
FIG. 9 is a diagram for explaining a method of displaying a notification object for application optimization according to an embodiment.

FIG. 9 is a diagram for explaining a method of displaying a notification object for application optimization according to an embodiment.

Referring to FIG. 9, a processor (e.g., processors 120 and 210) of an electronic device (e.g., the electronic device 101) may display a notification object 910 for application optimization on the display 900 (e.g., the display device 160 or the display 270). According to an embodiment, when a designated condition is satisfied, the processor may display the notification object 910 on the display 900. The designated condition may include, for example, a condition in which the FOTA update state of the electronic device or user input has occurred.

According to an embodiment, the notification object 910 may include an icon (or image) displayed on a status bar of the electronic device, a pop-up window displayed on a certain area of the display 900, or a card-type object displayed on a function control screen (e.g., quick panel). FIG. 9 illustrates the state in which the notification object 910 is displayed in the form of a card on the function control screen. The function control screen may be a screen for changing the configurations of functions supported by the electronic device or notifying a user of various events occurring in the electronic device, and for example, may be displayed by dragging downward while pressing the upper area of the screen of the electronic device.

According to an embodiment, the notification object 910 may include the number of applications to be optimized 911, a notification configuration button 913 of the notification object 910, or a display close button 915 of the notification object 910.

According to an embodiment, when user input on the notification object 910 is received, the processor may execute a configuration application for application optimization. The configuration application may be an application that supports configuration as to whether or not to optimize applications installed in the memory and the degree of optimization.

Figure 10A:
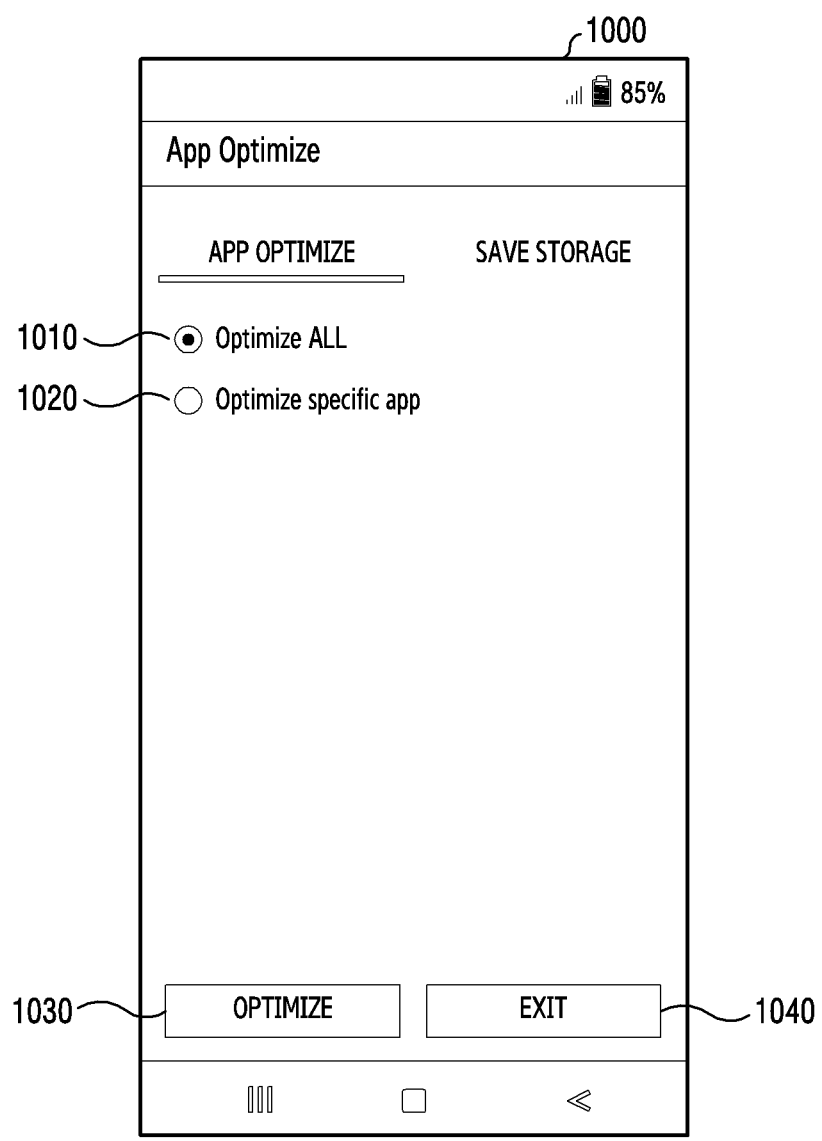
FIGS. 10A to 10D are diagrams for explaining an execution screen of a configuration application for application optimization according to an embodiment.
Figure 10B:
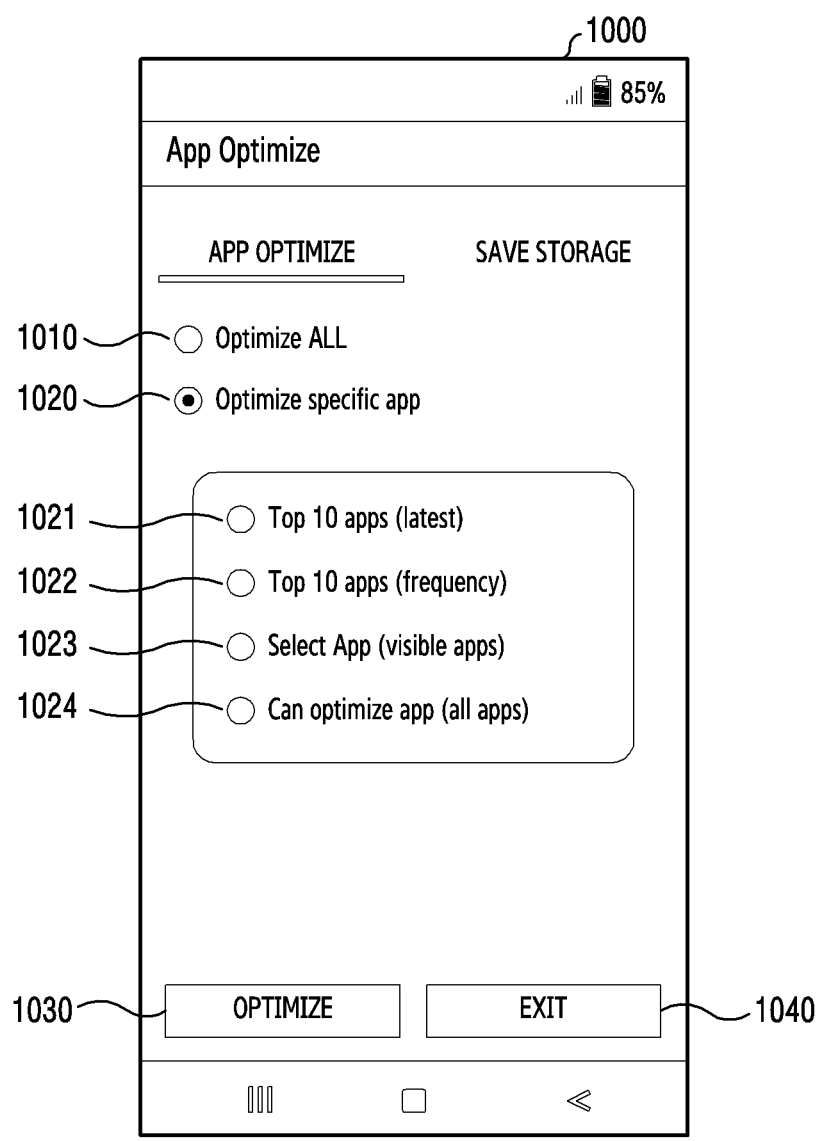
Figure 10C:
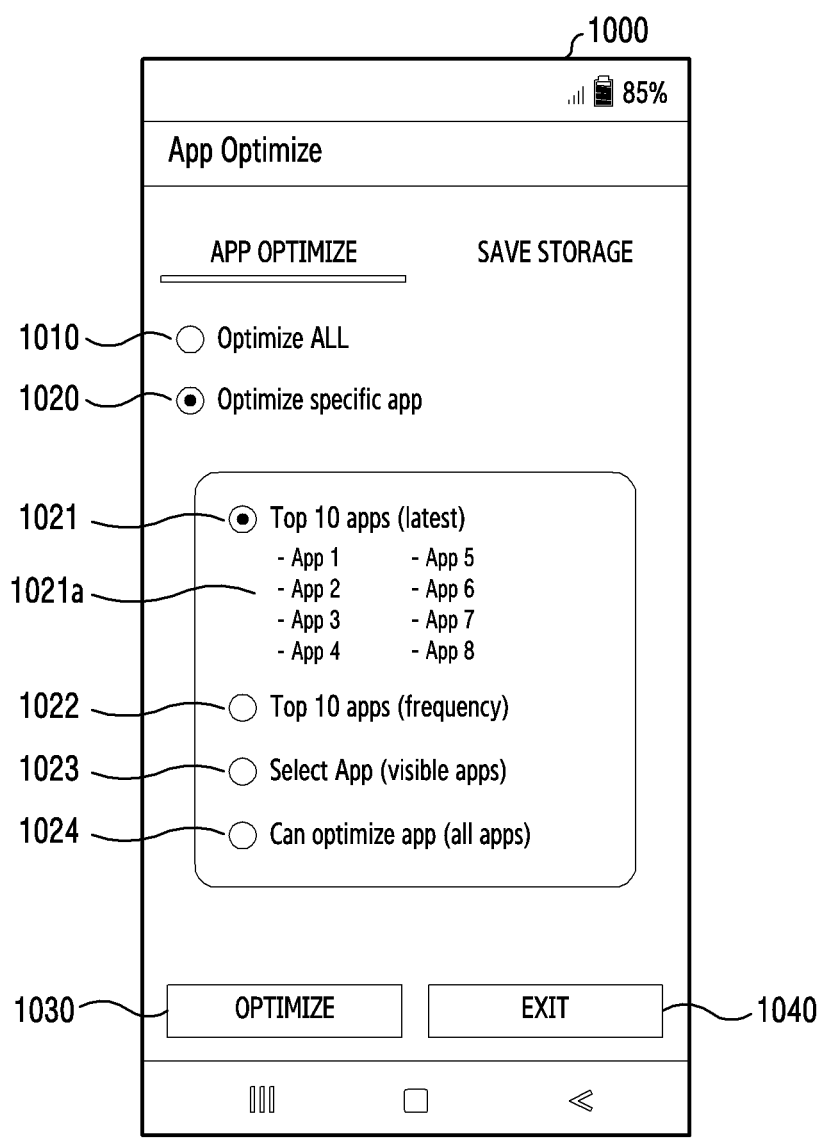
Figure 10D:
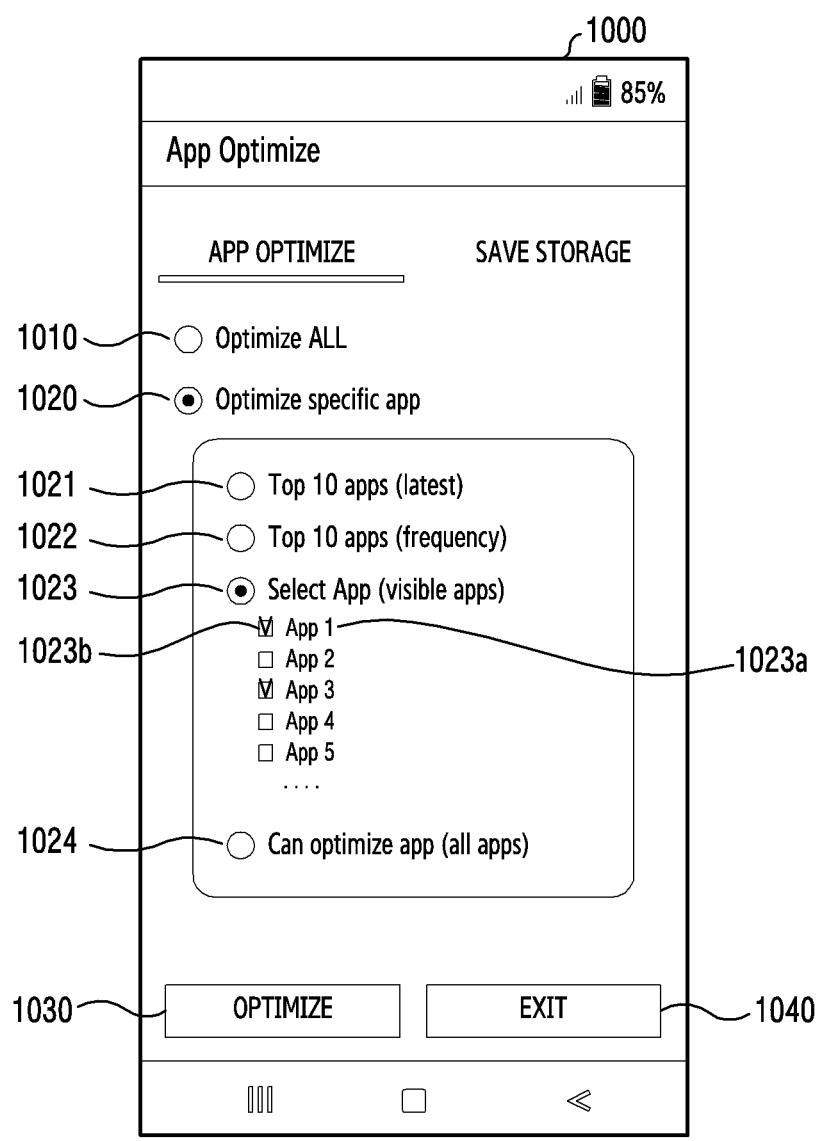

FIG. 10A is a diagram for explaining an execution screen of a configuration application for application optimization according to an embodiment, FIG. 10B is a diagram for explaining an execution screen of a configuration application for application optimization according to an embodiment, FIG. 10C is a diagram for explaining an execution screen of a configuration application for application optimization according to an embodiment, and FIG. 10D is a diagram for explaining an execution screen of a configuration application for application optimization according to an embodiment.

Referring to FIGS. 10A to 10D, a processor (e.g., processors 120 and 210) of an electronic device (e.g., the electronic device 101) may execute a configuration application for application optimization. The configuration application may be an application that supports configuration as to whether or not to optimize an application installed in a memory (e.g., the memories 130 and 230) and the optimization degree. FIGS. 10A to 10D illustrate an execution screen 1000 of the configuration application.

The execution screen 1000 of the configuration application may include a first button 1010 for selecting optimization for all applications installed in the memory, a second button 1020 for selecting optimization for a specific application installed in the memory, a third button 1030 for starting optimization of the selected application, and a fourth button 1040 for terminating the configuration application.

FIG. 10A illustrates an execution screen 1000 of the configuration application when the first button 1010 is selected, and FIG. 10B illustrates an execution screen 1000 of the configuration application when the second button 1020 is selected.

Referring to FIG. 10B, when the second button 1020 is selected through user input, selection items for selecting a specific application installed in the memory may be displayed on the execution screen 1000 of the configuration application. For example, the first selection item may include a fifth button 1021 for selecting a recently used application, the second selection item may include a sixth button 1022 for selecting a frequently used application, the third selection item may include a seventh button 1023 for selecting an application displayed on the launcher, and the fourth selection item may include an eighth button 1024 for selecting at least some applications from among all applications.

FIG. 10C illustrates an execution screen 1000 of the configuration application when the fifth button 1021 is selected, and FIG. 10D illustrates an execution screen 1000 of the configuration application when the seventh button 1023 is selected.

When the fifth button 1021 is selected, recently used application items 1021a selected based on usage history information of the application may be displayed on the execution screen 1000 of the configuration application, as shown in FIG. 10C. Likewise, even when the sixth button 1022 is selected, frequently used application items selected based on the usage history information of the application may be displayed on the execution screen 1000 of the configuration application.

When the seventh button 1023 is selected, as shown in FIG. 10D, application items 1023a displayed on the launcher may be displayed on the execution screen 1000 of the configuration application. In addition, an object 1023b (e.g., a check box) for selecting the displayed application item 1023a may also be displayed. Similarly, even when the eighth button 1024 is selected, all application items installed in the memory and objects for selecting the displayed application items may be displayed on the execution screen 1000 of the configuration application.

As described above, according to certain embodiments, the application optimization method of an electronic device (e.g., the electronic device 101) may include: determining whether a designated condition is satisfied; displaying, on a display of the electronic device (e.g., the display device 160 or display 270), a list of applications installed in a memory of the electronic device (e.g., the memory 130, 230) when the designated condition is satisfied; selecting at least one application from the list based on first user input received through an input device of the electronic device (e.g., the input device 150, 250); and compiling the selected at least one application.

According to certain embodiments, the application optimization method may further include selecting a compilation filter for the selected at least one application based on second user input received through the input device, such that the compiling of the selected at least one application may include compiling the selected at least one application based on the selected compilation filter.

According to certain embodiments, the application optimization method may further include displaying, on the display, information on the selected at least one application being compiled.

According to certain embodiments, the designated condition may include at least one of a condition in which the electronic device is in a firmware-over-the-air (FOTA) update state or a condition in which second user input is received through the input device.

According to certain embodiments, the application optimization method may further include displaying, on the display, a notification object for optimization of the selected at least one application when the designated condition is satisfied.

According to certain embodiments, the notification object may include at least one of an icon or an image displayed on a status bar of the electronic device, a pop-up window displayed on a predetermined area of the display, or a card-type object displayed on a function control screen.

According to certain embodiments, the application optimization method may further include executing a configuration application for optimizing the selected at least one application when receiving a second user input on the notification object through the input device.

According to certain embodiments, the designated condition may include a state in which the electronic device is replaced, and the application optimization method may further include: identifying user account information stored in an external server upon receiving second user input on the notification object through the input device; and receiving and applying a configuration value for optimization of the selected at least one application from the external server when the user account information is identified.

According to certain embodiments, the compiling of the selected at least one application may include: configuring a compilation filter for the selected at least one application based on a profile generated based on a usage pattern of the electronic device; and compiling the selected at least one application based on the configured compilation filter.

According to certain embodiments, the compiling of the selected at least one application may further include: configuring a compilation filter for the selected at least one application as an option to perform code verification of the selected at least one application (e.g., excluding other applications); and limiting compilation of the selected at least one application using a compilation filter of the configured option.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separated and disposed to other component. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   an input device;
   a display;
   a memory; and
   a processor operatively connected to the input device, the display and the memory,
   wherein the processor is configured to:
      determine whether a designated condition is satisfied;
      based on determining that the designated condition is satisfied, display, on the display, a list of applications installed in the memory;
      detect a first input through the input device selecting at least one application from the list;
      select a compilation filter for the selected at least one application, wherein the compilation filter defines at least one option for how to perform compilation operation; and
      based on the selected compilation filter, selectively compile the selected at least one application from a source programming code to a target executable code.

2. The electronic device of claim 1, wherein the processor is configured to: display, on the display, information on the selected at least one application that is being compiled.

3. The electronic device of claim 1, wherein the designated condition includes at least one of a first condition in which the electronic device is in a firmware-over-the-air (FOTA) update state, and a second condition in which a second user input is received through the input device.

4. The electronic device of claim 1, wherein the processor is configured to display, on the display, a notification object selectable to request optimization of the selected at least one application when the designated condition is satisfied.

5. The electronic device of claim 4, wherein the notification object comprises at least one of an icon or an image displayed on a status bar of the electronic device, a pop-up window displayed on a predetermined area of the display, or a card-type object displayed on a function control screen.

6. The electronic device of claim 4, wherein the processor is further configured to execute a configuration application for optimizing the selected at least one application, when receiving a second input through the input device selecting the notification object.

7. The electronic device of claim 4, wherein determining that the designated condition is satisfied includes detecting that the electronic device is in an initialized state, and wherein the processor is further configured to:
   identify user account information stored in an external server upon receiving a second input through the input device selecting the notification object; and
   based on identifying the user account information, receive a configuration value for optimization of the selected at least one application from the external server for application to optimization.

8. The electronic device of claim 1, wherein the processor is further configured to:
   configure the compilation filter for the selected at least one application, based on a historical usage pattern of the electronic device.

9. The electronic device of claim 1, wherein the processor is further configured to:
   configure the compilation filter for the selected at least one application to perform code verification only on the selected at least one application; and
   maintain a profile for the selected at least one application and limit compilation of the selected at least one application according to the configured compilation filter.

10. An application optimization method of an electronic device, the method comprising:
    determining, by at least one processor, whether a designated condition is satisfied;
    based on determining that the designated condition is satisfied, displaying, on a display of the electronic device, a list of applications installed in a memory of the electronic device;
    detecting a first input through an input device selecting at least one application from the list;
    selecting a compilation filter for the selected at least one application, wherein the compilation filter defines at least one option for how to perform compilation operation; and
    based on the selected compilation filter, selectively compiling the selected at least one application from a source programming code to a target executable code.

11. The method of claim 10, further comprising displaying, on the display, information on the selected at least one application that is being compiled.

12. The method of claim 10, wherein the designated condition includes at least one detecting that the electronic device is in a firmware-over-the-air (FOTA) update state, and detecting reception of a second input through the input device.

13. The method of claim 10, further comprising: displaying, on the display, a notification object selectable to request optimization of the selected at least one application when the designated condition is satisfied.

14. The method of claim 13, wherein the notification object comprises at least one of an icon or an image displayed on at least one of a status bar, a pop-up window displayed on a predetermined area of the display, and a card-type object displayed on a function control screen.

15. The method of claim 13, further comprising executing a configuration application for optimizing the selected at least one application when receiving a second input through the input device selecting the notification object.

16. The method of claim 13, wherein determining that the designated condition is satisfied includes detecting that the electronic device in an initialized state,
    the method further comprising:
    identifying user account information stored in an external server when receiving a second input through the input device selecting the notification object; and
    based on identifying the user account information, receiving a configuration value for optimization of the selected at least one application from the external server for application to optimization.

17. The method of claim 10, wherein the compiling of the selected at least one application includes:
    configuring the compilation filter for the selected at least one application, based on a historical usage pattern of the electronic device.

18. The method of claim 10, wherein the compiling of the selected at least one application further includes:
    configuring the compilation filter for the selected at least one application to perform code verification only on the selected at least one application; and
    maintaining profile for the selected at least one application limiting compilation of the selected at least one application according to the configured compilation filter.

* * * * *